United States Patent
Lewis et al.

(10) Patent No.: US 9,992,085 B1
(45) Date of Patent: Jun. 5, 2018

(54) SERVING RELATED CONTENT VIA A CONTENT SHARING SERVICE

(71) Applicant: Google Inc., Mountain View, CA (US)

(72) Inventors: Justin Lewis, Marina Del Rey, CA (US); Joseph Daverin, South Pasadena, CA (US)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 14/011,481

(22) Filed: Aug. 27, 2013

(51) Int. Cl.
G06F 15/173 (2006.01)
H04L 12/26 (2006.01)
G06Q 30/06 (2012.01)
G06Q 30/02 (2012.01)
H04L 12/58 (2006.01)

(52) U.S. Cl.
CPC ............. *H04L 43/08* (2013.01); *G06Q 30/02* (2013.01); *G06Q 30/0609* (2013.01); *G06Q 30/0621* (2013.01); *G06Q 30/0633* (2013.01); *H04L 51/046* (2013.01)

(58) Field of Classification Search
CPC ... H04L 51/046; H04L 12/1831; H04L 67/22; H04N 21/478; H04N 21/812; H04N 21/858; H04N 21/2393; H04N 21/4622; H04N 5/44543; H04N 21/44204; H04N 21/44222; H04N 21/454; H04N 21/47202; H04N 21/472; H04N 21/4722; H04W 4/18; G06Q 30/02; G06Q 30/0609; G06Q 30/0621; G06Q 30/0633
See application file for complete search history.

(56) References Cited

U.S. PATENT DOCUMENTS

| | | | | |
|---|---|---|---|---|
| 8,752,086 B2* | 6/2014 | Conant | ............. | H04N 7/17318 725/14 |
| 9,015,736 B2* | 4/2015 | Cordray | ................ | G06F 3/0482 725/10 |
| 2008/0066107 A1* | 3/2008 | Moonka | ............ | G06F 17/30796 725/42 |
| 2009/0254931 A1* | 10/2009 | Pizzurro et al. | .................. | 725/5 |

* cited by examiner

*Primary Examiner* — Chirag R Patel
*Assistant Examiner* — Rachel J Hackenberg
(74) *Attorney, Agent, or Firm* — Lowenstein Sandler LLP

(57) ABSTRACT

A system and method for serving related content via a content sharing service are provided. The system includes a monitoring module to monitor content and shared content being served; an interaction detection module to detect an interaction with the shared content via the content sharing service; a related content analyzer to analyze the monitored shared content, the detected interaction, and based on the analysis, to determine whether additional related content items are added to a related content list; and a related content list generator to generate an updated related content list with the additional related content items and the related content list.

19 Claims, 4 Drawing Sheets

SERVING RELATED CONTENT VIA A CONTENT SHARING SERVICE

BACKGROUND

Content sharing services serve content, such as pictures, videos, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and subsequently retrieve the content prior to serving the content to the visitors.

The visitor may employ various techniques to access the content. For example, the visitor may access the content sharing service through a browser. In another example, the visitor may access the content sharing service via an application installed on a mobile device. The visitor may use any sort of device enabled to interact with the content sharing service, such as a personal computer, mobile phone, or an Internet enabled television, for example.

The content sharing service may serve shared content along with the content. The shared content may be served before, during, or after the serving of the content. The shared content may be associated with meta information, and when the shared content is clicked-through by a user, the user may be redirected to additional content associated with the shared content. The shared content may provide information associated with a product or service related to the content.

The content sharing service may monetize serving the shared content. Specifically, the content sharing service may monetize whether the visitor clicked-through the shared content.

In certain instances, the shared content may be provided along with a function to bypass the shared content. The content sharing service may provide the function to bypass the shared content in order to prevent the visitor from being served shared content the visitor is not interested in. Thus, by maintaining the visitor's interest, the visitor is incentivized to maintain access to the content sharing service. The visitor may click-through on shared content, and the content sharing service may monetize the click-through.

The content sharing service may serve related content based on the content the visitor is presently consuming. The content sharing service may employ other heuristics to determine which related content items to present. The related content items may be presented as thumbnail images or mosaics in a layout determined by the content sharing service's implementation, a visitor preference, or the visitor's device/browser. A mosaic is an icon in which a moving image is presented to the viewer of the mosaic. The content sharing service may serve a predefined number of related content thumbnails.

The related content serves to maintain the visitor's access to the content sharing service. The related content, being tangentially related to the presently served content, may encourage the visitor to click-through and access the related content. This is based on the rationale that the visitor showed interest in the presently served content, and thus, may show interest in a related content item. Thus, by incentivizing the visitor to maintain access to the content sharing service, the visitor's probability of clicking through shared content increases. In the situations where the content sharing service monetizes serving shared content, the content sharing service may realize greater revenue by serving related content thumbnails.

SUMMARY

A system and method for serving related content via a content sharing service are provided. The system includes a monitoring module to monitor content and shared content being served; an interaction detection module to detect an interaction with the shared content via the content sharing service; a related content analyzer to analyze the monitored shared content, the detected interaction, and based on the analysis, to determine whether additional related content items are added to a related content list; and a related content list generator to generate an updated related content list with the additional related content items.

DESCRIPTION OF THE DRAWINGS

The detailed description refers to the following drawings, in which like numerals refer to like items, and in which.

DETAILED DESCRIPTION

Figure 1:
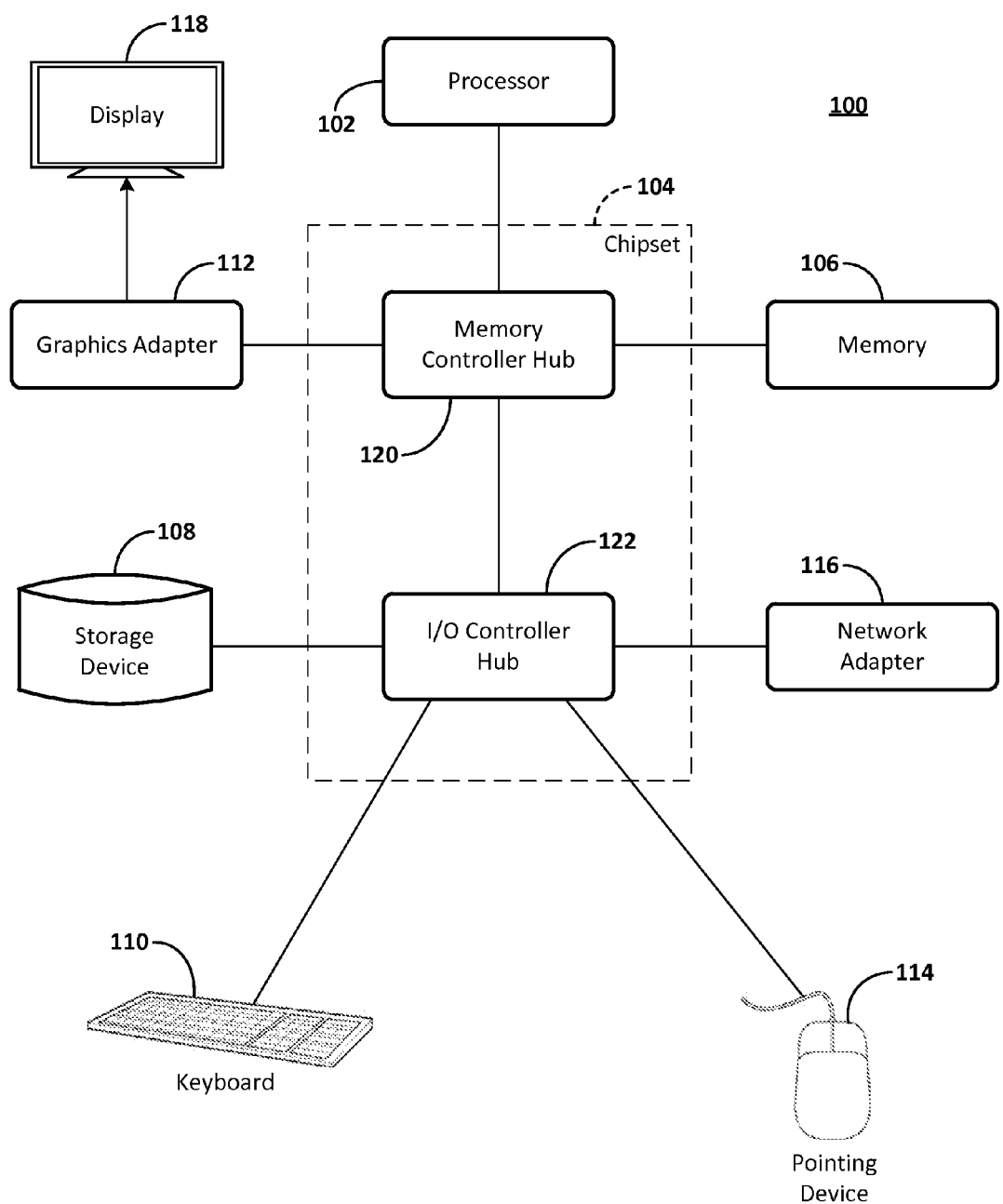
FIG. 1 is a block diagram illustrating an example computer.

A content sharing service serves content, such as videos, audio, text, multimedia, and combinations thereof, to various visitors to the content sharing service. The visitor may employ a device with an application installed on the device to access the content sharing service. The device may be a smart phone, a tablet, a personal computer, or a gaming system, for example. The application may be a mobile app, a browser, or an embedded application, for example. The content sharing service may detect the specific type of device and application employed to access the content sharing service, and custom tailor the serving of content based on the detected device and application.

The content sharing service, while serving content, may present links to other content items related to the content being served ("related content"). The related content may be represented via thumbnail or mosaic icons presented around or overlaid on the content being served. In response to clicking through the thumbnail or mosaic, the content sharing service may serve the related content.

The content sharing service may monetize the distribution of shared content to the visitor. The content sharing service may serve the shared content before, during or after the presentation of content. Thus, the content sharing service may realize revenue contingent on an amount of content accessed by the visitor.

In this way, the content sharing service may implement techniques to encourage the visitor to maintain access to, the content sharing service. By encouraging the visitor to maintain access, the ability to serve the visitor shared content increases, and subsequently, the probability the visitor clicks through the shared content also increases. Thus, the content sharing service may earn more revenue per visitor relative to the visitor's duration on the content sharing service.

One such way to encourage the visitor to maintain access to the content sharing service is to present thumbnails or mosaic icons directed to the content presently being consumed by the visitor, i.e, related content. A rationale for presenting related content is that the visitor has indicated interest in the present content being served (or to be served), and thus, may be interested in consuming related content at a greater probability than consuming a randomly selected content item.

Thus, for a content sharing service, the related content space serves a valuable role in retaining visitors to the content sharing service. However, the related content is selected primarily on the content being served, and specifically, to content that the visitor has explicitly selected. Thus, the related content may not reflect other interactions with the content sharing service.

The methods and systems disclosed herein serve related content based on a visitor's interaction with shared content served by the content sharing service. For example, if the visitor indicates interest in shared content, the related content being presented via thumbnail or mosaic icons may dynamically adjust or update to reflect or link to content items related to the shared content. Thus, the related content reflects not only content related to content presently being served, but content related to shared content being served as well. In this way, the related content being presented reflects a fuller representation of the visitor's interests.

Further, because shared content may be monetized, by presenting content related to the shared content as a thumbnail or mosaic icon in a related content area, the content sharing service may effectively call attention to the shared content's source or affiliated product or service. Thus, the content sharing, service may provide greater exposure to the shared content's associated products or services employing the aspects disclosed herein, versus situations where the related content items are wholly independent to the shared content.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 108 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements, For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
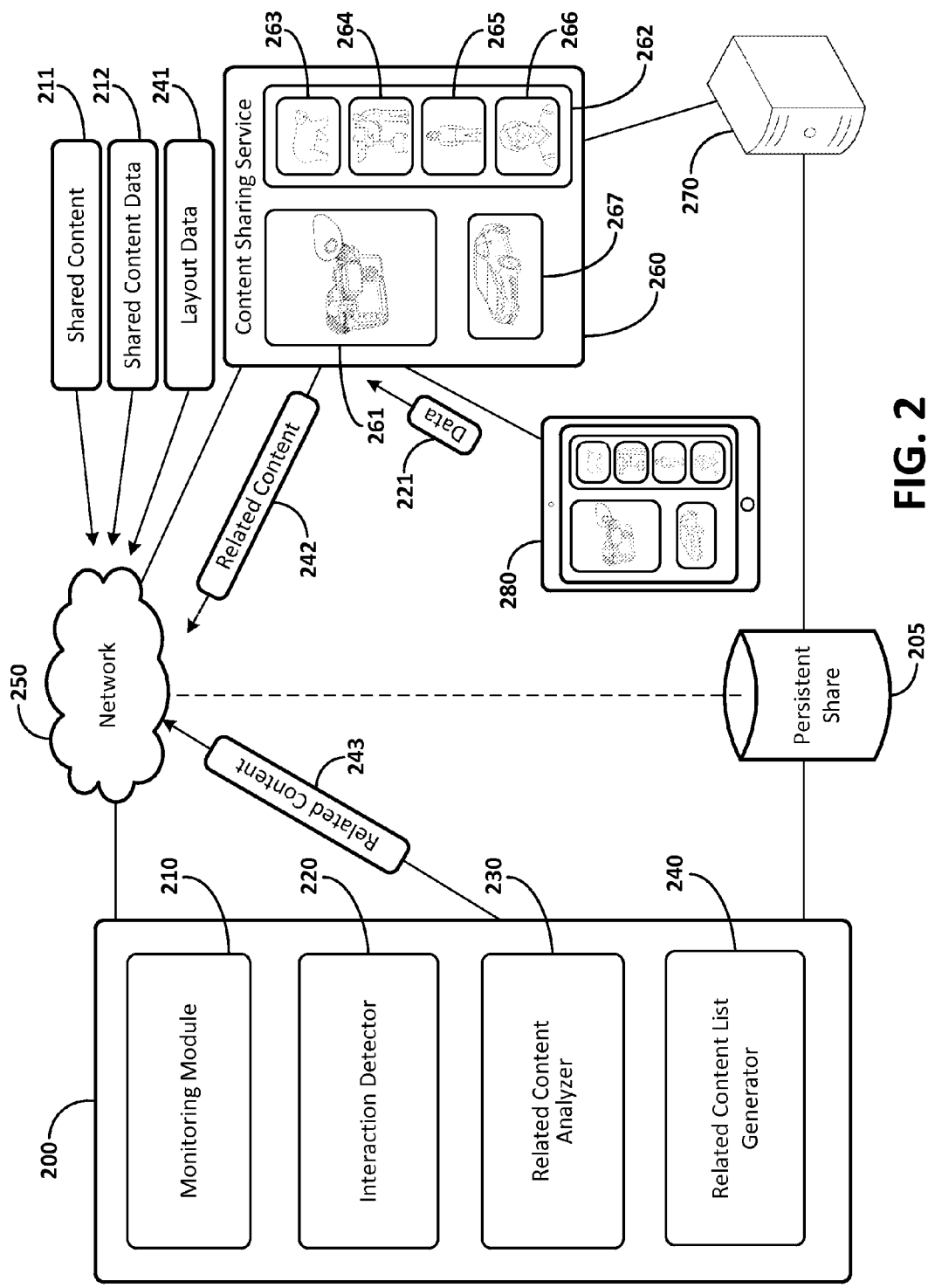
FIG. 2 illustrates an example of a system for serving related content via a content sharing service.

FIG. 2 illustrates an example of a system 200 for serving related content via a content sharing service 260. The system 200 includes a monitoring module 210, an interaction detection module 220, a related content analyzer 230, and a related content list generator 240. The system 200 may be implemented on a device, such as computer 100. The system 200 interacts with the content sharing service 260 via network 250. Alternatively, the system 200 may be implemented along with the content sharing service 260.

The content sharing service 260 serves content to devices, such as device 280, that access the content sharing service 260 over the network 250. The content sharing service 260 may be stored on a server 270. The server 270 may be a device, such as computer 100. The content may be stored on a persistent store 205. The persistent store 205 may be any of the enumerated data storage devices described in regards to storage device 108. The content stored in the persistent store 205 may be available to the system 200 via network 250.

Content may refer to videos, audio, multimedia embedded with meta information, text, or any combination thereof. The content may be sourced from visitors to the content sharing service 260, third-party publishers, or an operator of the content sharing service 260. The content may be indexed via keywords and other identifying information. The content may be retrieved by the visitor entering in a keyword search.

The content may be stored via an indexing technique, and accessed by a visitor traversing the index via a graphical user interface (GUI) implemented on the content sharing service 260. Alternatively, the content may be automatically served to the visitor based on prior interest or preferences indicated by the visitor.

An example content sharing service 260 layout is depicted in FIG. 2. The content sharing service 260 includes a frame 261, a related content area 262, and a shared content display area 267. The layout is replicated on the device 280 in response to the device 280 accessing the content sharing service 260. A visitor to the content sharing service 260 may interact with the content sharing service 260 via the device 280's various input options.

The frame 261 is an embedded content distribution application that serves content to device 280. The frame 261 may serve the content in which the visitor to the content sharing service 260 intended to access. In addition to serving the content, the frame 261 may serve shared content before, during, or after the presentation of the content. The content sharing service 260 may implement various techniques to determine which shared content items are presented along with the content being consumed by the visitor. For example, the content sharing service 260 may analyze the prior activities of the visitor to determine which shared content items may be most successful at attracting the visitor to purchase a good or service associated with the shared content.

The related content area 262 displays thumbnail or mosaic icons directed to content items related to the content item presently being served, such as icons 263, 264, 265, and 266. The icons may contain graphical, textual, ore combination thereof, information about the content items. In response to a visitor accessing any of the icons, the content sharing service 260 may update the content being served via frame 261.

The shared content display area 267 serves shared content presented along with the content being presented via frame 261. For example, the shared content display area 267 may display a static image with meta data that allows the operator of device 280 to click-through. In response to the operator of device 280 clicking through the shared content display area 267, the content sharing service 260 may direct the device 280 to a source related to the static image.

The monitoring module 210 monitors the content, shared content, and other information being presently served via the content sharing service 260. For example, the monitoring module 210 may monitor the content sharing service 260 to determine that frame 261 is, or has, served shared content 211. Further, the monitoring module 210 may monitor the content sharing service 260 to ascertain the related content 242 presently being served. Further, the monitoring module 210 may ascertain that the content sharing service 260 is presently, or has, served a specific shared content display 267 (shared content data 212). The various data ascertained by the monitoring module 210 may be stored in a data storage device associated with the system 200.

The interaction detector 220 detects an interaction with the content sharing service 260 associated with the data being monitored by the monitoring module 210. For example, the interaction detector 220 may detect that device 280 interacts with the shared content 211 being served prior to the presentation of content (via data 221). Data 221 may indicate that the device 280 did not enable a bypass function while being served a specific shared content item via frame 261. Data 221 may indicate that a watch later function was instigated, via device 280. In another example, data 221 may indicate that operator of device 280 hovered a pointer or another input device over the shared content display 267. As shown in FIG. 2, data 221 is sourced from device 280. Alternatively, data 221 may be sourced via the content sharing service 260.

The related content analyzer 230 analyzes the data sourced from, the monitoring module 210, the detection made by the interaction detection 220, and determines if additional related content may be added to the related content layout area 262. For example, the related content analyzer 230 may determine that the operator of device 280 expressed interest in a specific shared content item being served via frame 261. The related content analyzer 230 may record a correlation between the visitor and the specific shared content.

The related content list generator 240 generates updated related content 243. The updated related content 243 may be received by the content sharing service 260, and the related content area 262 may be dynamically updated accordingly. The related content list generator 240 may employ the analysis performed by the related content analyzer 230, layout data 241 (an indication of the space available for the related content area 262 to display related content), and the related content 242 presently being served by the content sharing service 260.

The updated related content 243 may include related content to the content and shared content presently being served by frame 261. Further, the decision to include related content directed to a specific shared content item may be contingent on the detection performed by the interaction detector 220. For example, if the interaction detector 220 detects that a specific visitor consumes a specific shared content item without enabling a bypass function, or indicates interest by indicating a watch later function, the related content included in the updated related content 243 may be directed to the shared content. Conversely, if the visitor shows no interest towards the served shared content (i.e. enables the bypass function), the related content list generator 240 may determine to not include any related content directed to the served shared content, and thus, the updated related content 243 may be a null set.

In the above example, the implementer of system 200 may determine a weighting associated with specific actions detected by the interaction detector 220. Further, the implementer of system 200 may determine the specific percentages of related content in the updated related content list 242 directed to the content and the shared content, respectively.

While the related content in the updated related content list 241 may reflect content and shared content having previously just been served, or being served, an implementer of system 200 may include related content directed to content or shared content having been served prior the currently presented content. For example, if an operator of user device 280 had previously indicated interest in a shared content item being presented (i.e. during a previous content presentation); the updated related content list 241 may include related content directed to the previously presented shared content.

The content sharing service 260 may determine an appropriate instance to update the related content area 262 with the updated related content list 241. In one implementation, the related content area 262 is dynamically updated in response to receiving an updated related content list 241. In another implementation, the related content area 262 incorporates the related content directed to the shared content in a subsequent presentation of related content.

Figure 3:
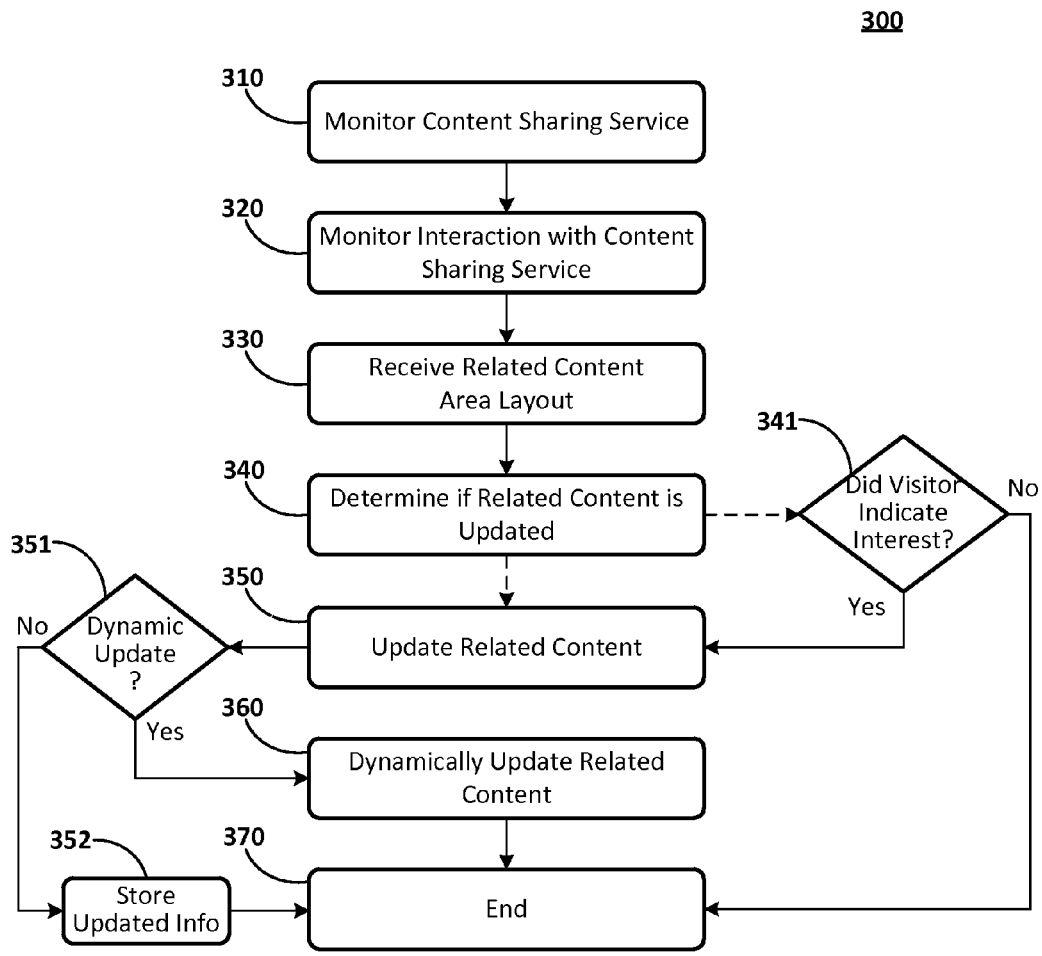
FIG. 3 illustrates an example of a method for serving related content via a content sharing service.

FIG. 3 illustrates an example of a method 300 for serving related content via a content sharing service 260. The method 300 may be implemented on a device, such as system 200.

In operation 310, the content sharing service 260 is monitored. information about the content being served is recorded, along with information about the shared content served prior, during or after the content. In addition to the monitoring of content and shared content, the monitoring may also include determining if other elements, such as static or animated image banners are displayed concurrently with, the serving of content or shared content.

In operation 320, an interaction with the content sharing service 260 is detected. Thus, if a device, such as device 280, is presently being seed content or shared content, the actions of the device 280's operator may be detected. Actions that may be detected include whether the operator consumed the shared content in its entirety (or beyond a certain time threshold) without enabling a bypass function. Another example of an action that may be detected is whether device 280's operator enabled a watch later function presented along with the shared content being presented. In another example, a detection may be made that the device 280's operator interacted with the image or animated image banner (i.e. hovered with a pointer over the image or animated banner).

In operation 330, the layout of the presently served related content information is received. The layout may be contingent on various factors, such as the device accessing the content sharing service 260, an operator's preference, a content publishers preference, for example. The layout may determine the amount of related content that may be indicated in any given presentation state for the content sharing service 260.

In operation 340, a determination is made whether to update related content. In one implementation, the method 300 may proceed automatically to operation 350.

In another implementation, the method 300 may proceed to operation 341. In operation 341, a determination is made as to whether a visitor accessing the content sharing service 260 indicated any interest in shared content presently being served (or served in conjunction with the presently served content). The determination may be made with the information related to the detection of operation 320. If the method 300 determines that the visitor indicates interest in the shared content, the method 300 proceeds to operation 350. If no, the method 300 proceeds to end 370, and the related content list is not updated.

In operation 350, the related content list is updated. Similar to the operation performed by element 240, the related content list may be updated based on the interest indicated or shown towards the shared content. Thus, related content directed to the shared content may be retrieved and inserted into the presentation of the related content.

In operation 351, if an option to dynamically update related content is selected, the method 300 proceeds to operation 360. Conversely, the method 300 ends. if the content sharing service 260 refreshes a related content area, the updated related content items determined in operation 350 may be employed to populate the refreshed related content area.

In operation 360, the list of related content items is employed to dynamically update a related content area. Thus, the related content shown in a related content area is dynamically refreshed to indicate thumbnail or mosaic icons related to the content being served, and the shared content previously served. The amount or percentages of the related content being directed to the content or the shared content may be determined by an implementer of method 300.

Figure 4:
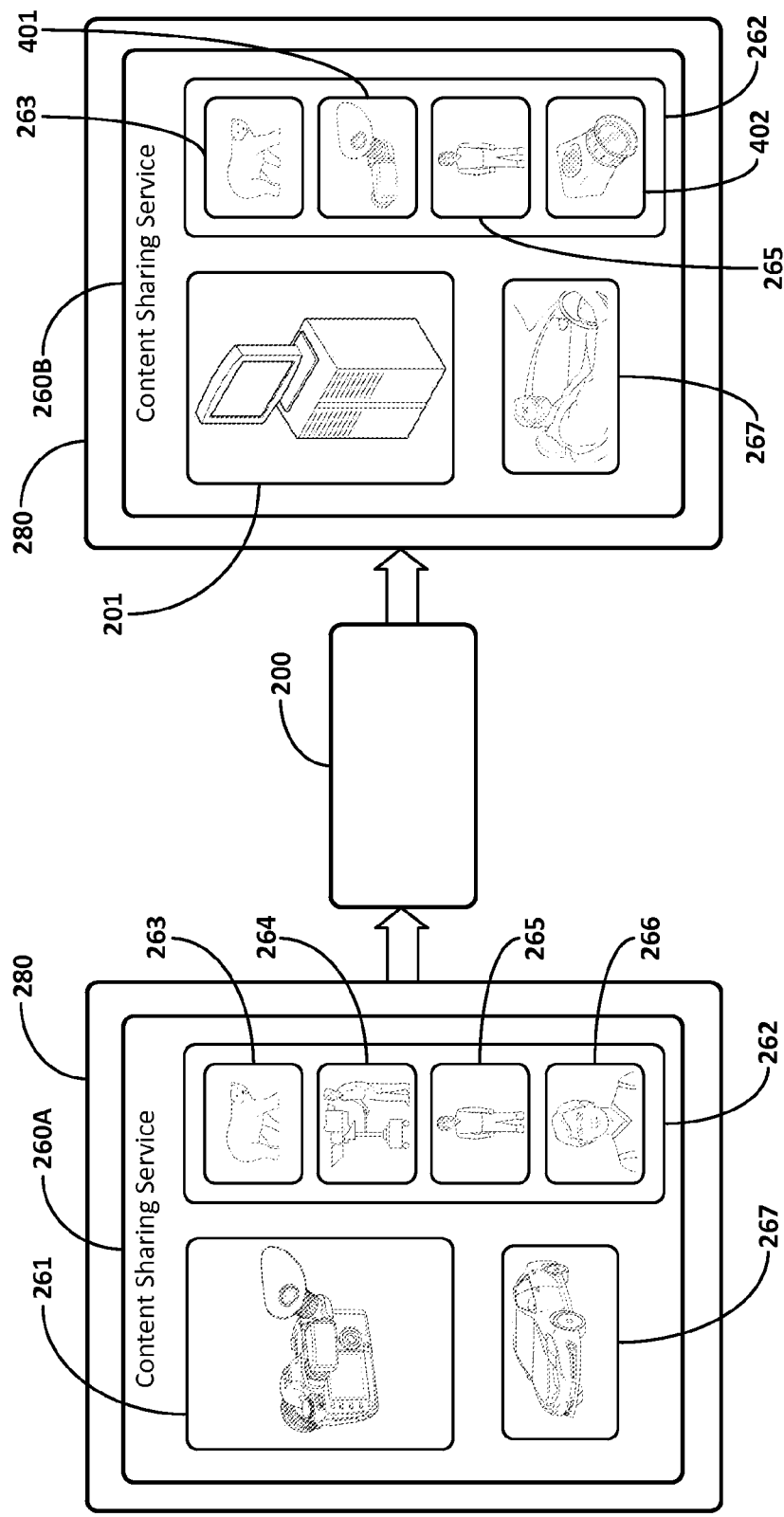
FIG. 4 illustrates an example of the system in FIG. 2 being implemented via a content sharing service accessed by a device.

FIG. 4 illustrates an example of system 200 being implemented via a content sharing service 260 accessed by a device 280. Initially, the device 280 is being served shared content in frame 261 (as depicted by state 260A). The shared content is automatically served to the device 280, and may be selected via any sort of shared content distribution scheme employed by the content sharing service 260.

In state 260A, the device 280 also includes a related content area 262. The related content area 262 includes thumbnail icons 263-266. Each of the thumbnail icons 263-266 are related to the content to be served in state 260B.

In state 260B, the content sharing service 260 implements system 200, and serves content via frame 261. The content reflects an item in which device 280's operator explicitly chose to access. A detection may be made that indicates the device 280 watched the shared content being served in state 260A in its entirety (or over a predetermined threshold). Thus, the related content area 262 reflects this. Thumbnails 401 and 402 replace thumbnails 264 and 265, respectively. Thumbnails 401 and 402, in response to being clicked-through or accessed, direct the device 280 to content related to the shared content served in state 260A. Thus, as a result of system 200 being implemented in FIG. 4, the related content area 262 shows thumbnail icons associated with both the content and the shared content presently being served.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more, of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system comprising:
    a memory;
    a processor operatively coupled to the memory, the processor to:
        serve video content and shared ad content from a content sharing service, the shared ad content comprising a first shared ad content and a second shared ad content;
        provide a set of content items related to the video content, the set of content items to be presented concurrently with the shared ad content and the video content;
        detect interactions with the shared ad content, the interactions comprising an indication of user input enabling a bypass function while the first shared ad content is being served and an indication that the second shared ad content is consumed beyond a time threshold; and
        update the set of content items presented concurrently with the shared ad content based on an analysis of the interactions with the shared ad content, wherein the update removes a content item associated with the first shared ad content responsive to the enabling of the bypass function and adds a content item associated with the second shared ad content responsive to the consumption beyond the time threshold, wherein the second shared ad content and the content item associated with the second shared ad content are presented concurrently.

2. The system according to claim 1, wherein the interactions are from a visitor to the content sharing service and comprise data indicating the visitor does not enable the bypass function while being served a third shared ad content, and in response to the visitor not enabling the bypass function while being served the additional shared ad content, adding multiple content items directed to the third shared ad content to the set of content items.

3. The system according to claim 2, wherein in response to the enabling of the bypass function while being served the first shared ad content, removing multiple content items associated with the first shared ad content from the set of content items related to the video content.

4. The system according to claim 1, wherein the interactions further comprise user input to enable a watch later function while being served additional shared ad content, and in response to enabling the watch later function, adding a content item directed to the additional shared ad content to the set of content items.

5. The system according to claim 1, wherein the plurality of content items related to the video content are presented as thumbnail icons around the video content served by the content sharing service.

6. The system according to claim 5, the processor further to serve content associated with a thumbnail icon of the thumbnail icons in response to the thumbnail icon being enabled.

7. The system according to claim 2, wherein an amount of the content items added to the set of content items is based on a predetermined weighting.

8. A method comprising:
serving video content and shared ad content from a content sharing service, the shared ad content comprising a first shared ad content and a second shared ad content;
providing, by a processor, a set of content items related to the video content, the set of content items to be presented concurrently with the shared ad content and the video content;
detecting interactions with the shared ad content, the interactions comprising an indication of user input enabling a bypass function while the first shared ad content is being served and an indication that the second shared ad content is consumed beyond a time threshold; and
updating the set of content items presented concurrently with the shared ad content based on an analysis of the interactions with the shared ad content, wherein the updating removes a content item associated with the first shared ad content and adds a content item associated with the second shared ad content, wherein the second shared ad content and the content item associated with the second shared ad content are presented concurrently;
wherein at least one of the monitoring, detecting, and updating being performed by the processor.

9. The method according to claim 8, wherein the detecting further comprises:
detecting a visitor does not enable the bypass function while being served a third shared ad content; and
in response to the visitor not enabling the bypass function while being served the third shared ad content, adding multiple content items directed to the third shared ad content to the set of content items.

10. The method according to claim 8, wherein in response to the enabling of the bypass function while being served the first shared ad content, removing multiple content items directed to the first shared ad content from the set of content items related to the video content.

11. The method according to claim 8, wherein detecting further comprises detecting whether a visitor to the content sharing service enables a watch later function while being served additional shared ad content, and in response to the visitor enabling the watch later function, adding content items directed to the additional shared ad content to the set of content items.

12. The method according to claim 8, wherein the content items related to the video content are presented as thumbnail icons around the video content being served by the content sharing service.

13. The method according to claim 12, wherein in response to one of the thumbnail icons being enabled, the content sharing service serves content associated with the one of the thumbnail icons.

14. The method according to claim 11, wherein an amount of the content items added to the set of content items is based on a predetermined weighting.

15. A non-transitory machine-readable storage medium comprising instructions to cause a processor to perform operations comprising:
serving video content and shared ad content from a content sharing service, the shared ad content comprising a first shared ad content and a second shared ad content;
providing a set of content items related to the video content, the set of content items to be presented concurrently with the shared ad content and the video content;
detecting interactions with the shared ad content, the interactions comprising an indication of user input enabling a bypass function while the first shared ad content is being served and an indication that the second shared ad content is consumed beyond a time threshold;
updating the set of content items presented concurrently with the shared ad content based on an analysis of the interactions with the shared ad content, wherein the updating removes a content item associated with the first shared ad content and adds a content item associated with the second shared ad content, wherein the second shared ad content and the content item associated with the second shared ad content are presented concurrently; and
wherein at least one of the monitoring, detecting and updating being performed by the processor.

16. The non-transitory machine-readable storage medium according to claim 15, wherein the detecting further comprises:
detecting a visitor does not enable the bypass function while being served a third shared ad content; and
in response to the visitor not enabling the bypass function while being served the third shared ad content item, adding multiple content items directed to the third shared ad content item to the set of content items.

17. The non-transitory machine-readable storage medium according to claim 15, wherein in response to the enabling of the bypass function while being served the first shared ad content, removing multiple content items from the set of content items.

18. The non-transitory machine-readable storage medium according to claim 15, wherein detecting further comprises detecting whether a visitor to the content sharing service enables a watch later function while being served additional shared ad content, and in response to the visitor enabling the watch later function, adding content items directed to the shared ad content to the set of content items.

19. The non-transitory machine-readable storage medium according to claim 15, wherein the content items related to the video content are presented as thumbnail icons around the video content being served by the content sharing service.

* * * * *